June 30, 1942.  D. M. PIERPONT  2,288,206
REVERSE GEAR
Filed June 30, 1938  4 Sheets—Sheet 3

INVENTOR
Douglas M. Pierpont,
BY
ATTORNEY

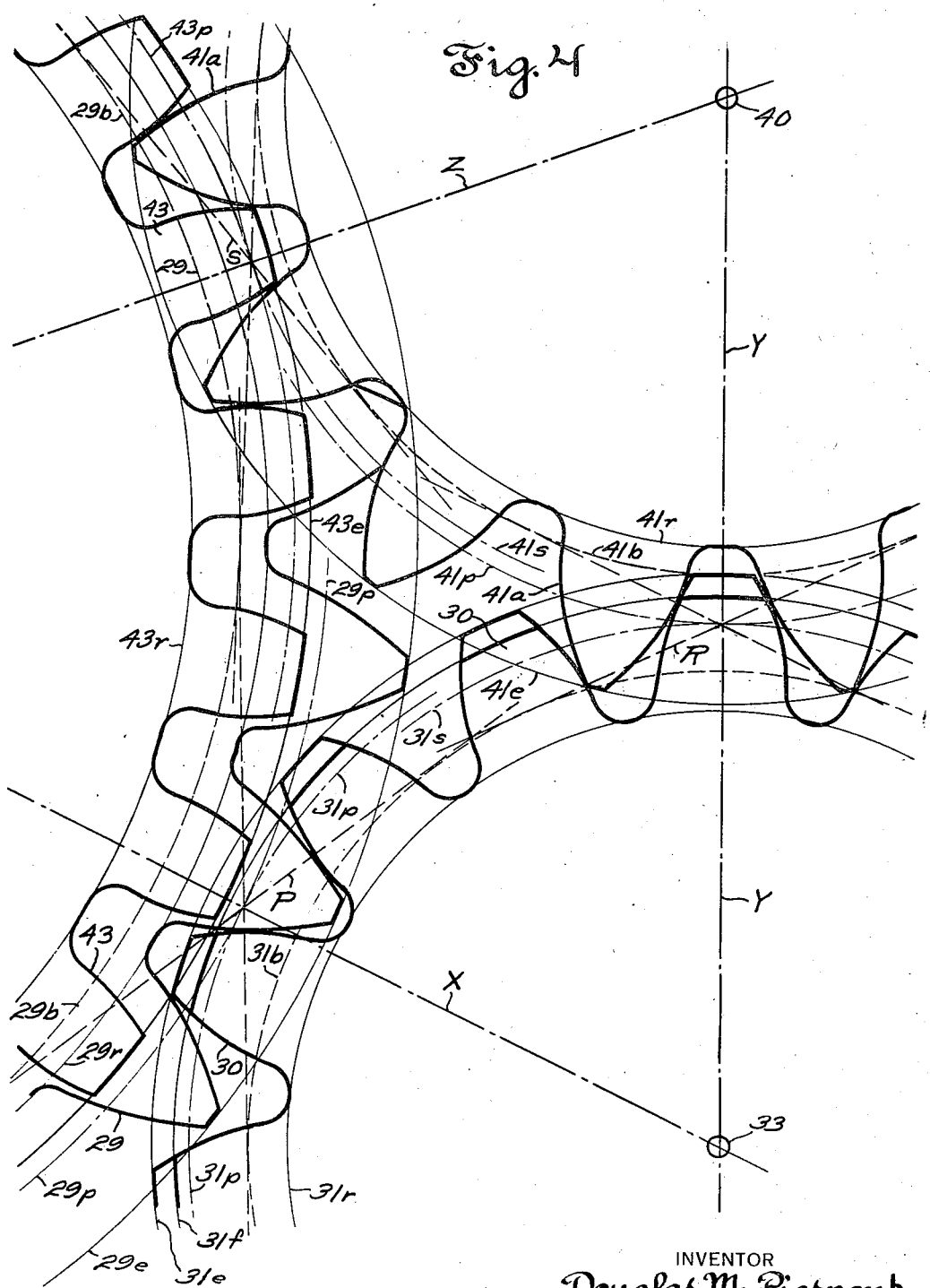

Patented June 30, 1942

2,288,206

UNITED STATES PATENT OFFICE 2,288,206

REVERSE GEAR

Douglas M. Pierpont, Hamden, Conn., assignor to The Snow & Petrelli Mfg. Co., New Haven, Conn., a corporation of Connecticut Application June 30, 1938, Serial No. 216,644

24 Claims. (Cl. 74—298)

This invention relates to planetary gearing of particular value in reverse gears, meaning that type of transmission unit employed for controlling the application of engine power to a boat propeller selectively in forward or reverse directions.

Owing to crowded quarters, to the importance of minimum inclination of propeller shaft away from the horizontal, and to other problems peculiar to power plants in boats, axial space in the reverse gear unit is at a premium. The need for axial compactness is so great that it is of high importance that gears of sun and planet nature occupying neighboring planes of rotation shall be placed closely side by side with only a minimum of clearance space between them. This is accomplished in United States Patents Nos. 1,832,467 and 1,918,775, granted respectively November 17, 1931 and July 18, 1933, to A. T. Nabstedt, by arranging the engine and propeller shafts in close end-to-end coaxial relation so that the sun gears may be fixed respectively on the ends of said shafts in almost touching proximity. No space is available between the planes of rotation occupied by such sun gears to accommodate intermediate such planes any additional sun or planet gears or any bearings therefor. In the said Nabstedt patents, the planet pinions comprise a short pinion meshing with one of the sun gears and a long planet pinion meshing both with said short pinion and with the other sun gear. Hence the long planet pinion in addition to meshing with one sun gear must axially overlap and clear the teeth of the other sun gear with which it is not in mesh in order that it may be sturdily supported in bearings at both of its sides. This requires the sun gear which does not mesh with the long pinion to be sufficiently smaller in diameter than the sun gear which does mesh with the long pinion to enable the teeth of the long pinion so to clear the teeth of the smaller sun gear.

Heretofore it has been considered necessary for successful gear action, good wearing qualities and required strength of teeth, that the smaller and larger sun gears should be provided with unlike numbers of teeth respectively proportional to their unlike diameters, such teeth when of involute contour having their involute curvature developed from base circles of unlike diameter respectively proportioned to the unlike pitch diameters of the two sun gears in accordance with the conventional practice in the involute system of shaping gear teeth. The planet pinions heretofore used with such different sized sun gears have themselves been alike in pitch diameter and numbers of teeth with the result that when reverse power is transmitted from the engine shaft to the propeller shaft by means of such sun gears and planet pinions, the propeller shaft has been driven in reverse at a speed considerably lower than that of the engine shaft where the sun gear of larger diameter is carried by the engine shaft. This larger sun gear cannot well be placed on the propeller shaft because too fast reverse speed of the propeller would result, which either would overload the designed power capacity of the engine or rotate the propeller at a speed too high to accord with the designed efficiency of coaction of its blade shapes against the water. It is preferred that the speed ratio of the propeller shaft to the engine shaft shall be the same when the boat is being propelled in reverse as when being propelled forwardly, or when the engine shaft is direct coupled to the propeller shaft by clutches. Prior to the present invention this result has not been possible of accomplishment except by arrangements of gearing which necessitate objectionable increase in the axial length of the reverse gear unit as a whole.

An object of this invention is to obtain a one-to-one reverse drive ratio between the engine shaft and the propeller shaft without increasing to any extent the overall axial space occupied by gears when they are as axially compact as disclosed in the aforesaid Patent No. 1,832,467 to A. T. Nabstedt, and to accomplish this without adding any extra parts or appreciably sacrificing any features of strength, wearing qualities or efficiency of power transmission.

Another object is to obtain such reverse drive ratio without resorting to contours and relationships in the working surfaces of gear teeth that detract from the strength, good wearing qualities, silence in operation, and other operating and structural advantages inherent in gear teeth of the involute system.

These and related objects together with examples of actual construction by which they may be attained are more fully explained in the following description in which reference is had to the accompanying drawings, wherein:

Fig. 4 is a greatly enlarged view of the intermeshed teeth of the group of gears and pinions of Fig. 3 showing such teeth as they are viewed in Fig. 2, and diagrammatically indicates the relationship of the dimensional properties of each of said gears and pinions as to the construction of their teeth and as to operative spacing.

Figure 1:
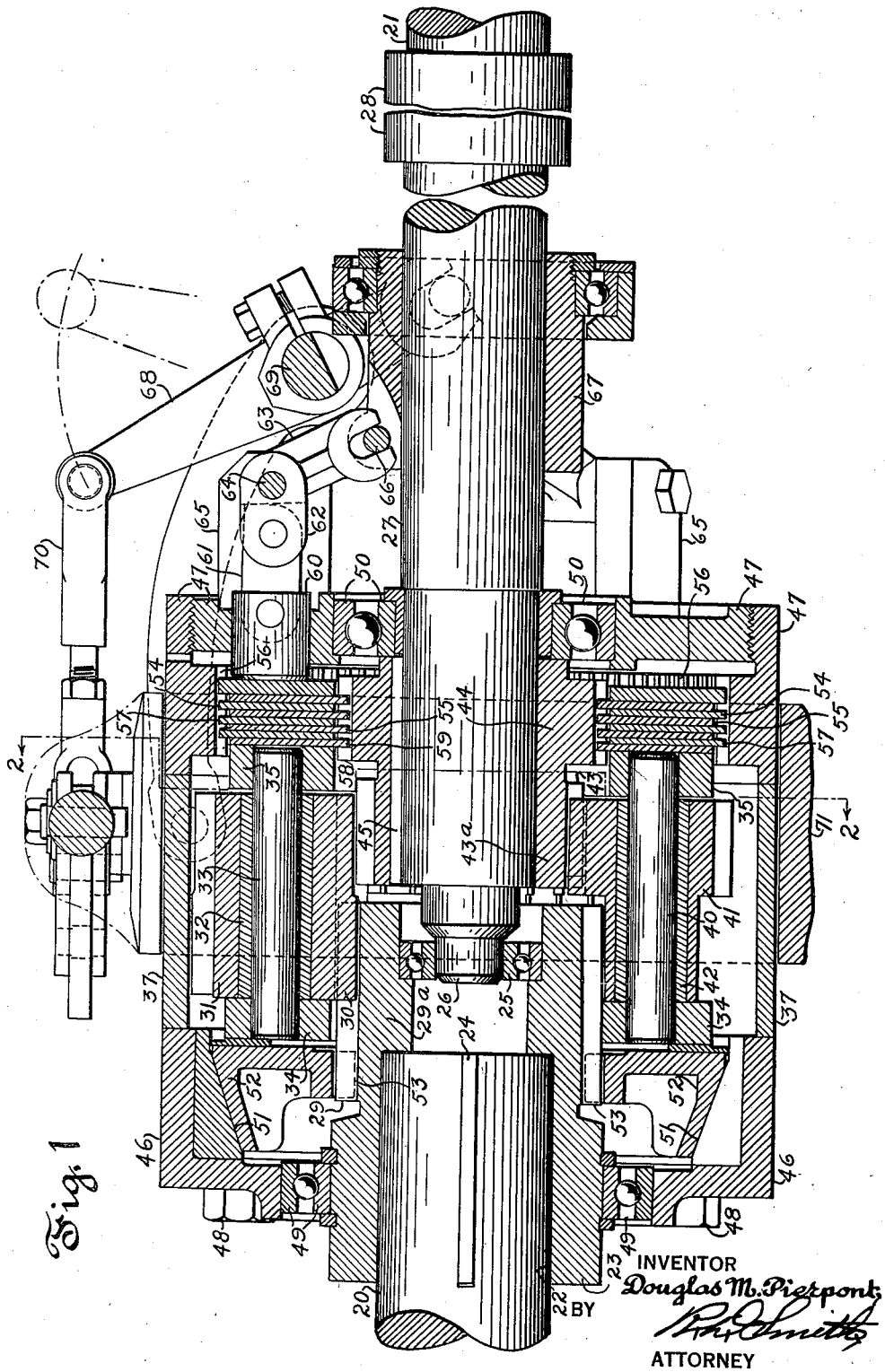
Fig. 1 is a vertical, central, longitudinal, sectional view through a reverse gear transmission unit in which the present invention is incorporated.

The particular reverse gear herein chosen for illustration is of the type which is especially adapted for use in marine craft and is operative between an engine-shaft 20 and a propeller-shaft 21 to rotatably connect the two said shafts for effecting either forward or reverse rotation of the propeller-shaft. The engine-shaft 20 fits within a cylindrical socket 22 formed in the forward end of a drive-sleeve 23 to which latter the said engine-shaft 20 is rotatively coupled by means of a key 24.

Within the reduced inner end of the drive-sleeve 23 is mounted an antifriction bearing 25 receiving the reduced inner end 26 of a power-output shaft 27 the outer or rear end of which latter is connected by means of a suitable coupling 28 to the adjacent end of the propeller-shaft 21 before referred to.

The periphery of the inner end of the drive-sleeve 23 is provided with a series of gear-teeth 29 which are of special character as will be hereinafter described and which in effect convert the rear end of the drive-sleeve 23 into a drive-gear 29$^a$. The teeth 29 of the drive-sleeve 23 mesh into substantially the entire forward half of pinion-teeth 30 formed upon the periphery of a long pinion 31 having an antifriction bearing bushing 32 therein which serves to mount the said gear with freedom for rotation upon a shaft 33. By reference to Fig. 2 it will be seen that there are three long pinions 31 alike and arranged around and meshing with the drive-gear 29$^a$ and hence there are a corresponding number of shafts 33.

Figure 2:
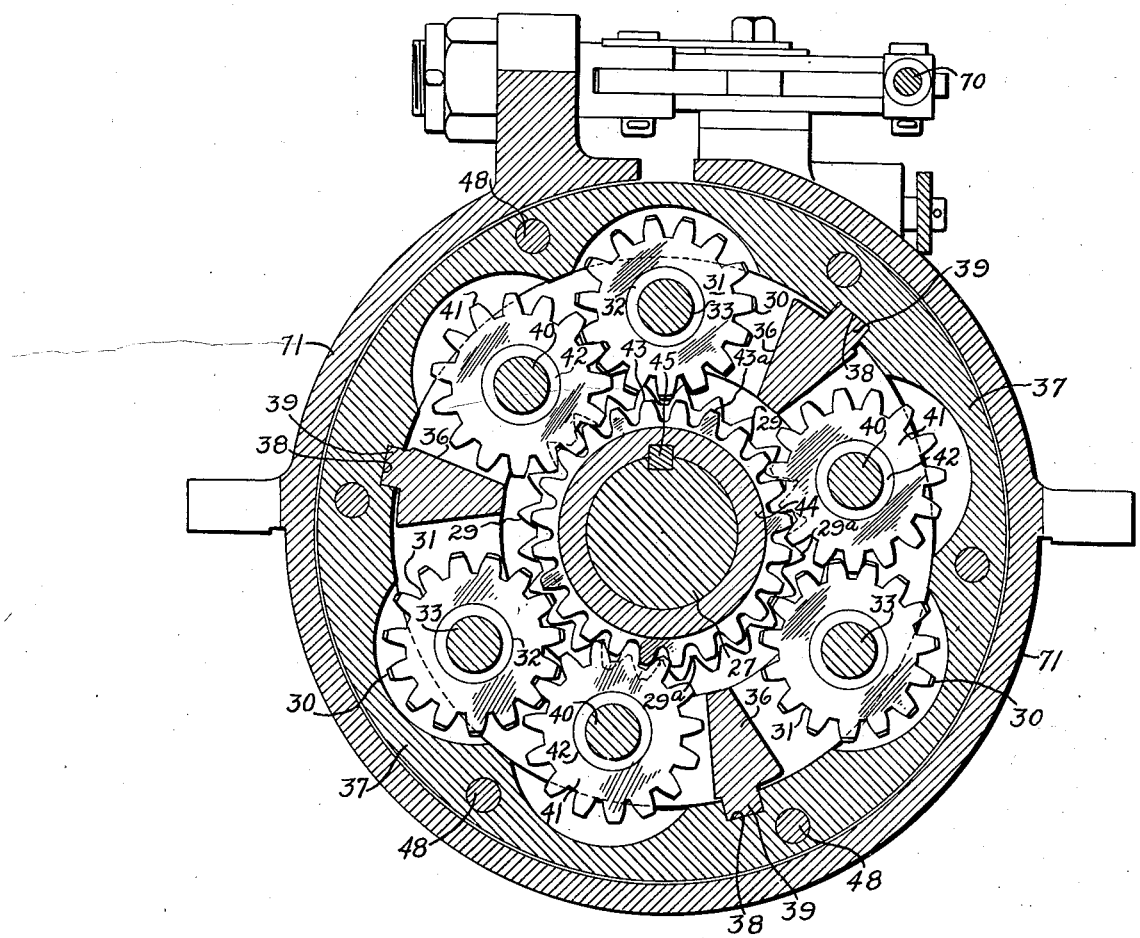
Fig. 2 is a transverse sectional view thereof taken on the line 2—2 of Fig. 1, looking in the direction of the arrows.
Figure 3:
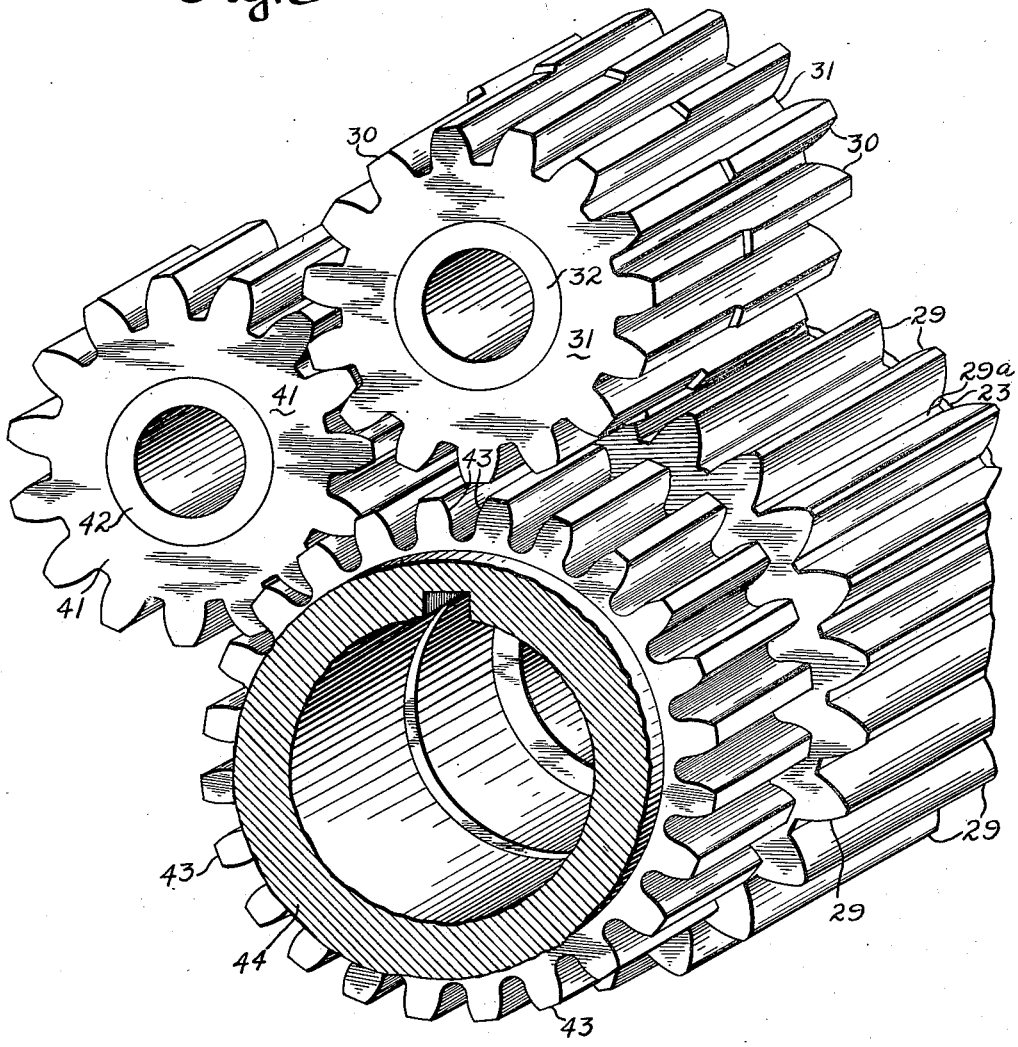
Fig. 3 is a broken away perspective view of a group of gears comprising the drive-gear, the power-output gear, a long intermediate pinion and a short intermediate pinion.

The forward end of each of the shafts 33 is supported in the forward ring 34 of a gear-cage which also includes a rear ring 35 in which the rear ends of the shafts 33 bear and which is held in spaced relationship with respect to the forward ring 34 by means of three or other suitable number of spacing-bars 36 (Fig. 2).

The gear-cage above referred to (including the parts 34, 35 and 36) has located around its outer periphery a hollow brake drum 37 forming the central portion of the reverse gear casing or housing to be more fully described. The said brake drum is formed in its inner periphery with three or other suitable number of coupling-grooves 38 extending parallel with the axes of the shafts. Each of the said coupling-grooves receives with a sliding fit a coupling-rib 39 one of which outstands from the outer surface of each of the three spacing-posts 36 as clearly shown in Fig. 2. By this means the rings 34 and 35 and the parts carried thereby are coupled to the brake-drum for concurrent bodily rotation therewith but are free to slide axially with respect to the said brake-drum for purposes hereinafter to appear.

The front and rear rings 34 and 35 in addition to supporting the three shafts 33 before referred to also support three or other suitable number of parallel pinion-shafts 40 upon each of which latter is mounted a short pinion 41 provided with an antifriction bearing or bushing 42. Each of the short pinions 41 meshes with the rear portion of the teeth 30 of each long pinion 31 and also meshes with the teeth 43 of a power-output gear 43$^a$ formed integral with and projecting forwardly from a power-output sleeve 44 arranged coaxially with respect to the drive-sleeve 23 and rotatively coupled by means of a key 45 to the power-output shaft 27 before referred to.

The power-output gear 43$^a$ and its teeth 43 are of special character as are the drive-gear 29$^a$ and its teeth 29 as will hereinafter be described in detail.

The brake-drum 37, above described, is flanked at its forward end by a casing-end member 46 of cup-shaped form and at its rear end by a similarly shaped casing-end member 47. The members 46 and 47, just described, together with the brake-drum member 37 constitute the casing of the reverse gear and all three of these members are rigidly coupled together in any approved manner such for instance as by a plurality of bolts 48. Interposed between the forward casing-end member 46 and the drive-sleeve 23 is an anti-friction bearing 49 which permits free relative rotation between the said parts 46 and 23 when the drum 37 is braked to cause the reverse rotation of the power-output shaft 27 as compared to the direction of rotation of the engine-shaft 20 in a manner as will hereinafter appear. In a manner similar to the antifriction bearing 49 just above referred to there is interposed between the rear casing-end member 47 and the power-output shaft 27 an antifriction bearing 50 which permits free relative rotation between the parts 47 and 27 when the drum 37 is braked to effect the reverse rotation of the said power-output shaft 27.

For the purpose of effecting the coupling together of the engine-shaft 21 and the power-output shaft 27 for concurrent rotation thereof in unison and in the same direction, the forward casing-end member 46 is provided in its interior with a conical clutch-surface 51 which is adapted to be engaged by the conical outer periphery of a cone-clutch member 52 which is provided in its inner periphery with a series of coupling-teeth 53 which interfit with the forward ends of the teeth 29 of the drive-gear 29$^a$ in such manner that the parts 29$^a$ and 52 are coupled together against relative rotation but with freedom for the said clutch-member to be moved axially with respect to the member 29$^a$ and the other axially fixed parts of the structure. As thus constructed and arranged the cone-clutch member 52 will, when forced into engagement with the clutch-surface 51 of the casing-end member 46, serve to couple the engine powered drive-shaft 20 to the entire casing or housing structure comprising in the main the parts 46, 37 and 47.

For the purpose of coupling the casing-end member 47 and hence the entire casing structure directly to the power-output sleeve 44, and hence to the power-output shaft 27, two sets of ring-like friction-plates 54 and 55 are employed. The friction-plates 54 are interlocked rotatively with, but free for axial movement relative to, the casing-end member 47 which latter is provided internally with a series of coupling-teeth 56 interfitting with coupling-teeth 57 formed upon the outer periphery of the friction-plates 54. The friction-plates 55 are alternated with the friction-plates 54 and are interlocked rotatively with, but free for axial movement relative to, the power-output sleeve 44 which latter is provided with a series of coupling-teeth 58 interfitting with coupling-teeth 59 formed upon the inner circular edge of each of the friction-plates 55.

For the purpose of forcing the friction-plates 54 and 55 into holding, frictionally coupled engagement with one another and concurrently forcing the conical outer periphery of the cone-clutch member 52 into holding frictionally coupled engagement with the clutch-surface 51 of the casing-end member 46, there is provided a suitable number of plungers 60 (Fig. 1). Each plunger 60 is operatively connected by means of a link 61 to the arm 62 of a bell-crank lever 63 which is supported upon a transverse pin 64 carried by suitable bracket 65 projecting rearwardly from the rear casing-end member 47. The other and forked extremity of each bell-crank lever 63 is coupled by means of a pin 66 to a sleeve 67 slidably mounted upon the projecting portion of the power-output shaft 27.

The sleeve 67 just above referred to is shifted axially along the power-output shaft 27 for effecting the advancement and retraction of the plungers 60 by means of a lever 68 which is adjustably fixed on a laterally-extending control-shaft 69 which may be manually rocked by means of any suitable control handle, not herein shown, but appearing and explained in the aforesaid Nabstedt Patent No. 1,832,467. The outer end of the lever 68 has pivotally connected to it a rod 70 which through a suitable toggle or cam mechanism disclosed in greater detail in U. S. Patent No. 2,127,305, granted August 16, 1938 to A. T. Nabstedt, herein serves to effect the contraction and expansion of a brakeband 71 encircling the brake-drum 37 and adapted on occasion frictionally to hug the outer periphery thereof in a manner to halt the rotating movement of the casing (comprising the parts 37, 46 and 47).

Inasmuch as those modifications in construction of the mechanism disclosed in the aforesaid Nabstedt patent which comprise the present improvements occur more particularly in the gear train or its equivalent, comprising the gears 29ᵃ, 31, 41 and 43ᵃ, it is sufficient for an understanding of the operation of the reverse gear herein illustrated to state that when the parts are in the positions in which they are shown in the accompanying drawings, the brake-band 71 will be expanded to free the brake-drum 37 and hence the casing parts 46, 47, and pinion-cage parts 34, 35, 36, etc., for rotation in unison while the drive-shaft 29 will be frictionally coupled to the power-output shaft 27 for the purpose of driving the latter in the same direction as the said engine-shaft through the medium of the clutch member 52, the casing (comprising the parts 46, 37 and 47), the friction-plates 54 and 55 and the power-output sleeve 44.

When the control-shaft 69 is actuated to swing the lever 68 into the position in which it is indicated by broken lines in Fig. 1, the plungers 60 will be withdrawn toward the right and hence the frictional direct driving connection between the drive-sleeve 23 and the power-output sleeve 44 will be broken. As this takes place, the brake-band 71 will be contracted and caused to hug the outer surface of the brake-drum 37 thus preventing the entire casing unit 46, 37 and 47 and the parts coupled thereto from rotating. In this manner the entire pinion-cage and the pinions carried thereby will also be prevented from bodily revolving about the longitudinal axis of the shafts 20 and 27.

With the parts shifted as above described the drive-gear 29ᵃ will effect the rotation of each of the long pinions 31 and these pinions will respectively and independently effect the rotation of the short pinions 41. The short pinions 41 will effect the rotation of the power-output gear 43ᵃ and hence of the power-output shaft 27 but in a direction reverse to that in which the engine-shaft 20 is rotated and at a speed ratio of one-to-one owing to the novel character of my improved gear-train.

Coming now to the novel gear train which makes possible the reverse drive in the ratio of one-to-one, it will be noted that concentric gears 29ᵃ and 43ᵃ which may be termed sun gears and intermediate pinions 31 and 41 which may be termed planet pinions have teeth of unusual appearance. The peculiarities of construction of these teeth are represented on a larger scale in Fig. 4. In describing the details of Fig. 4, the following nomenclature will be used with respect to each gear and pinion.

*Pitch diameter.*—The diameter of the pitch circle (represented by dot-dash lines) which in the case of intermeshing pinions or pinion and gear, is proportioned to the numbers of teeth. By this definition each of the planet pinions has a slightly different pitch diameter for meshing with the other planet pinion than it has for meshing with its cooperative sun gear.

*Diametrical pitch.*—The number of teeth divided by the pitch diameter.

*Circular pitch.*—The length of the pitch circle divided by the number of teeth.

*Overall diameter.*—The diameter to the outermost ends of the teeth.

*Root diameter.*—The diameter to the innermost point of the space between the teeth.

*Base diameter.*—The diameter of the base circle (shown in light broken lines) from which the involute curve is developed which forms the contour of the face and flank portions of the tooth.

*Face of the tooth.*—The working portion of its involute surface radially exterior to the pitch circle.

*Flank of the tooth.*—The working portion of its involute surface radially interior of the pitch circle.

*Center distances.*—The distances between the axes of pinion shafts 33, 40 and 20 (or 27).

*Pitch angle.*—The angle which subtends a portion of the pitch circle equal in length to the circular pitch.

*Angle of action.*—The angle through which the gear or pinion rotates while one of its teeth remains in working contact with the tooth of an intermeshed pinion.

*Angle of pressure.*—In the case of intermeshed pinion and gear, or intermeshed pinions, the angle which the straight line of pressure normal to the involute tooth curves at their point of contact makes with the common tangent to the pitch circles. These lines of pressure are shown as broken straight lines intersecting at the point of tangency of the pitch circles and fall tangent to the base circles thus indicating that all teeth 29, 30, 41ᵃ and 43 are of involute curvature and developed from the respective base circles shown in light broken lines.

The diagrammatic representation of the constructional lines above defined are identified as follows with respect to each of the gears and pinions.

|  | Gear 29ᵃ | Pinion 31 | Pinion 41 | Gear 43ᵃ |
| --- | --- | --- | --- | --- |
| Pitch circle | 29ᵖ | 31ᵖ and 31ˢ | 41ᵖ and 41ᵃ | 43ᵖ |
| Overall circle | 29ᵉ | 31ᵉ and 31ᶠ | 41ᵉ | 43ᵉ |
| Root circle | 29ʳ | 31ʳ | 41ʳ | 43ʳ |
| Base circle | 29ᵇ | 31ᵇ | 41ᵇ | 29ᵇ |

Line X intersects the axes of shafts 27 and 33; line Y, the axes of shafts 33 and 40; and line Z the axes of shafts 40 and 27.

In the order of drive, line P shows the constant direction of working pressure between the teeth of gear 29ᵃ and pinion 31; line R, between the teeth of pinion 31 and pinion 41; and line S, between the teeth of pinion 41 and gear 43ᵃ.

An example of dimensional specifications which have proven to produce a successfully operative set of transmission gears and pinions for the stated purposes of this invention is given in the following table of data as a guide to the construction of one possible embodiment thereof, the dimensions being in inches except where otherwise stated.

|  | Drive gear 29ᵃ having teeth 29 | Long pinion 31 having teeth 30 | Short pinion 41 having teeth 41ᵃ | Power output gear 43ᵃ having teeth 43 |
|---|---|---|---|---|
| Number of teeth | 24 | 15 | 15 | 24 |
| Pitch diameter | 4.923 | 3.000 and 3.077 | 3.000 and 2.923 | 4.677 |
| Diametrical pitch | 4.875 | 5.000 and 4.875 | 5.000 and 5.131 | 5.131 |
| Circular pitch | .6444 | .6444 and .6283 | .6444 and .6122 | 6.122 |
| Overall diameter | 5.424 | 3.288 and 3.184 | 3.464 | 4.800 |
| Root diameter | 4.548 | 2.497 | 2.558 | 4.102 |
| Base diameter | 4.350 | 2.719 | 2.719 | 4.350 |
| Pitch angle | 15° | 24° | 24° | 15° |
| Angle of action | 17° 41′ | 20° 55′ | 29° 11′ | 19° 14′ |
| Angle of pressure | 27° 5′ | 25° | 25° | 21° 26′ |
| Center distances | 4.000 | 3.000 | 3.800 | |

From the foregoing data observed in connection with Fig. 4, it will be seen that considerable departure from conventional gear construction has been devised to make possible a reverse gear transmission between concentric engine and propeller shafts in which the reverse drive is accomplished in the speed ratio of one-to-one. Conspicuous among these departures is the provision of sun gears having a like number of teeth while having unequal pitch diameters and widely differing overall diameters in order that the teeth of the long planet pinion 31 may clear the teeth of sun gear 43ᵃ while meshing both with sun gear 29ᵃ and the other planet pinion 41, which latter must mesh not only with planet pinion 31 but also with sun gear 43ᵃ. In part, the problem has been solved by making the planet pinions themselves unlike. It will be noted further that the base circles (from which the involutes of the teeth are developed) are alike in each of the sun gears and are alike in each of the planet pinions. This causes the diameter of the root circle of sun gear 29ᵃ to be larger than the diameter of the base circle in this same sun gear. Help is obtained in providing clearance between sun gear 43ᵃ and that portion of the length of teeth of long pinion 31 which meshes with short pinion 41 by reducing the overall diameter of said portion of the long pinion teeth from that of the circle 31ᵉ to that of the circle 31ᶠ in Fig. 4.

To successfully withstand the heavy power duty of a marine reverse gear without undue noise and wear, gears embodying such departures from conventional construction as is herein disclosed must still retain certain well understood characteristics of tooth shape and operative relationship. The circular pitch of intermeshed gears must be equal. The angle of action (equal to the sum of the angle of approach and the angle of recession) must be such that no two teeth of intermeshed gears shall leave contact before following teeth have come into contact to take up the drive duty. The angle of pressure must not be too unfavorable else undue friction will develop at the bearings. The tooth shapes are preferably involute for the well understood purpose of permitting backlash adjustment by varying center distances without loss of efficient rolling action of tooth upon tooth.

In these improvements all of these basic requirements have been retained while at the same time novel departure has been made in other aspects of the tooth shapes and arrangement for the purpose of meeting certain problems peculiar to the described requirements existing in a marine reverse gear. The scope of the invention which is intended to be defined and covered by the appended claims will be understood to include all gearing construction fairly coming within the terms of the claims without limitation to any dimension, shape or relationship of teeth elsewhere particularly specified herein.

I claim:

1. A reverse gear including a gear-train comprising in combination, two coaxial sun gears one of which is larger than the other and both of which are provided with a like number of teeth, and a reversing gear-train interconnecting the two said coaxial gears in such manner as to cause one thereof to reversely drive the other.

2. A reverse gear including a gear-train comprising in combination, two sun gears one of the said sun gears being larger than the other and both of the said sun gears being provided with a like number of teeth, and a planetary reversing gear-train interconnecting the two said coaxial gears in such manner as to cause one thereof to drive the other at the same speed of rotation in reverse direction.

3. A reverse gear including a gear-train comprising in combination, two coaxial sun gears one of which is larger than the other and both of which are provided with a like number of teeth, and a reversing gear-train interconnecting the two said coaxial gears and including two planet pinions having a like number of teeth, one of which pinions meshes with the smaller of the two said sun gears and the other of which pinions meshes with the larger of said sun gears.

4. A reverse gear for transmitting power in reverse rotative direction from an engine shaft to a propeller shaft arranged in coaxial end to end relation thereto, including in combination, sun gears having substantially different overall diameters including a drive gear fixed on the end of said engine shaft and a propeller gear fixed on the adjacent end of said propeller shaft and closely flanking said drive gear, a short planet pinion externally meshed with said propeller gear, a long planet pinion externally meshed both with said short planet pinion and said drive gear, and structure carrying said planet pinions, said gears and pinions being so constructed and related that one of said sun gears is driven in one-to-one ratio to the other of said sun gears, and said sun gears having a like number of teeth and meshing respectively with the said planet pinions upon pitch circles of different diameters.

5. A reverse gear for transmitting power in reverse rotative direction from an engine shaft to a propeller shaft arranged in coaxial end-to-end relation thereto, including in combination, sun gears having a like number of teeth and having substantially different overall diameters including a drive gear fixed on the end of said engine shaft and a propeller gear fixed on the adjacent end of said propeller shaft and closely flanking said drive gear, a short planet pinion externally meshed with said propeller gear, a long planet pinion having the same number of teeth as said short planet pinion and externally meshed both with said short planet pinion and said drive gear, and structure carrying said planet pinions, said gears and pinions being so constructed and related that one of said sun gears is driven in one-to-one ratio to the other of said sun gears.

6. Reverse gearing for connecting aligned driving and driven shafts for rotation of the driven shaft in the same direction as the driving shaft and also for rotation in the opposite direction at the same speed as the driving shaft comprising, clutch mechanism for connecting the shafts for rotation in the same direction, and reversing gearing for connecting the shafts for the reversing rotation of the driven shaft at the same speed as the driving shaft including, aligned driving and driven shaft spur gears having different overall diameters, a long pinion gear overlying both spur gears having a series of teeth that mesh with the teeth of the large diameter spur gear and another series of teeth that clear the teeth of the small diameter spur gear, a reversing pinion meshing with the last named series of teeth and with the teeth of the small diameter spur gear, a pinion carrier, and means for holding said carrier stationary to secure reverse drive of the driven shaft, the speed ratio between said long pinion gear and the large diameter spur gear being substantially equal to the speed ratio between the long pinion gear and the small diameter spur gear through the reversing pinion, said large and small shaft gears having the same number of teeth.

7. A reverse gear for transmitting power in reverse rotative direction from an engine shaft to a propeller shaft arranged in coaxial end to end relation thereto, including in combination, sun gears having substantially different overall diameters including a drive gear fixed on the end of said engine shaft and a propeller gear fixed on the adjacent end of said propeller shaft and closely flanking said drive gear, a short planet pinion externally meshed with the smaller of said sun gears, a planet wheel having a first toothed portion in mesh with said short planet pinion overlying and clearing said smaller sun gear and a second toothed portion coaxial with said first toothed portion in mesh with the larger of said sun gears, and structure carrying said planet pinion and wheel, said gears said pinion and said wheel being so constructed and related that one of said sun gears is driven in one-to-one ratio to the other of said sun gears, said sun gears having a like number of teeth and meshing respectively with said planet pinion and wheel upon pitch circles of different diameters.

8. A reverse gear for transmitting power in reverse rotative direction from an engine shaft to a propeller shaft arranged in coaxial end to end relation thereto, including in combination, sun gears having substantially different overall diameters and a like number of teeth including a drive gear fixed on the end of said engine shaft and a propeller gear fixed on the adjacent end of said propeller shaft and closely flanking said drive gear, a short planet pinion externally meshed with the smaller of said sun gears, a planet wheel having a first toothed portion in mesh with said short planet pinion overlying and clearing said smaller sun gear and a second toothed portion coaxial with said first toothed portion in mesh with the larger of said sun gears, and structure carrying said planet pinion and wheel, said gears said pinion and said wheel being so constructed and related that one of said sun gears is driven in one-to-one ratio to the other of said sun gears.

9. Reverse gearing for connecting a driving and a driven shaft for rotation of the driven shaft in the same direction as the driving shaft and also for rotation in the opposite direction at the same speed as the driving shaft comprising, clutch mechanism for connecting the shafts for rotation in the same direction, and reversing gearing for connecting the shafts for reverse rotation of the driven shaft at the same speed as the driving shaft including, driving and driven shaft gears having the same number of teeth but different diametrical pitches, a rotatable gear carrier, a plurality of sets of gears carried by said carrier and connecting said shaft gears each set of gears comprising, a reversing pinion meshing with one shaft gear, and a planet wheel having a first toothed portion in mesh with said reversing pinion and whose teeth are of the same diametrical pitch thereof and overlie and clear said one shaft gear and having a second toothed portion coaxial with said first toothed portion in mesh with the other shaft gear and whose teeth are of the same diametrical pitch thereof, which said first and second toothed wheel portions mesh respectively with said reversing pinion and said other shaft gear on pitch circles of different diameters and which said intermeshed first toothed wheel portion reversing pinion and shaft gear have a speed changing ratio equal to the speed changing ratio of said intermeshed second toothed wheel portion and other shaft gear, together with means for holding said carrier stationary to produce reverse drive of the driven shaft.

10. Reverse gearing for connecting driving and driven shafts for rotation of the driven shaft in the same and also in the opposite direction as the driving shaft, comprising aligned driving and driven shaft gears, a wheel carrier, a reversing gear journaled in said carrier having teeth that mesh with one shaft gear, a planet wheel having a first toothed portion in mesh with said reversing gear and whose teeth are of a common diametrical pitch therewith and overlie and clear said one shaft gear and having a second toothed portion coaxial with said first toothed portion in mesh with the other shaft gear and whose teeth are of a common diametrical pitch therewith different from the first said common diametrical pitch.

11. Reverse gearing for connecting a driving and a driven shaft for rotation of the driven shaft in the same direction as the driving shaft and also for rotation in the opposite direction at the same speed as the driving shaft comprising, clutch mechanism for connecting the shafts for rotation in the same direction, and reversing gearing for connecting the shafts for reverse rotation of the driven shaft at the same speed as the driving shaft including, driving and driven shaft gears having the same number of teeth but different diametrical pitches, a reversing pinion meshing with one shaft gear, a planet wheel having a first toothed portion in mesh with said reversing pinion and overlying and clearing one shaft gear and having a second toothed portion coaxial with said first toothed portion in mesh with the other shaft gear, the speed changing ratio of said intermeshed first toothed wheel portion reversing pinion and shaft gear being equal to the speed changing ratio of said intermeshed second toothed wheel portion and other shaft gear.

12. A reverse gear including a gear train comprising in combination, two coaxial sun gears one of said sun gears being larger in diameter than the other and both of said sun gears being provided with a like number of teeth, and a planetary reversing gear train constructed and interconnecting the two said coaxial gears in such manner as to cause one thereof to drive the other at the same speed of rotation in reverse direction.

13. A reverse gear for transmitting power in reverse rotative direction from an engine shaft to a propeller shaft arranged in coaxial end-to-end relation thereto, including in combination, sun gears having a like number of teeth and having substantially different overall diameters including a drive gear fixed on the end of said engine shaft and a propeller gear fixed on the adjacent end of said propeller shaft and closely flanking said drive gear, a short planet pinion externally meshed with said propeller gear, a long planet pinion having the same number of teeth as said short planet pinion and externally meshed both with said short planet pinion and said drive gear said sun gears meshing with the said planet pinions upon pitch circles of different diameters and said planet pinions meshing with each other upon pitch circles of like diameters, and structure carrying said planet pinions, said gears and pinions being so constructed and related that one of said sun gears is driven in one-to-one ratio to the other of said sun gears.

14. A reverse gear for transmitting power in reverse rotative direction from an engine shaft to a propeller shaft arranged in coaxial end-to-end relation thereto, including in combination, sun gears having substantially different overall diameters and fixed respectively on the end of one of said shafts and on the adjacent end of the other of said shafts, a planet reversing pinion externally meshed with one of said sun gears, a long planet pinion externally meshed both with said planet pinion and with the other of said sun gears and having teeth whose lengths are continued sufficiently far in an axial direction to overlap at least in part the teeth of both of said sun gears, and structure carrying said planet pinions, the speed ratio of one of said sun gears to said long planet pinion being reversely equal to the speed ratio of the other of said sun gears to said long planet pinion whereby one of said sun gears is driven in one-to-one ratio to the other of said sun gears.

15. A reverse gear as described in claim 14, including the combination therein defined, in which the said sun gears mesh respectively with the said planet pinions upon pitch circles of different diameters.

16. A reverse gear as described in claim 14, including the combination therein defined, in which the said planet pinions have an equal number of teeth.

17. A reverse gear as described in claim 14, including the combination therein defined, in which the said sun gears mesh respectively with said planet pinions upon pitch circles of different diameters and the said planet pinions have an equal number of teeth.

18. A reverse gear as described in claim 14, including the combination therein defined, in which the center distance between the common axis of the said shafts and the pivotal axis of the said short planet pinion is less than the center distance between said common axis and the pivotal axis of the said long planet pinion.

19. A reverse gear as described in claim 14, including the combination therein defined, in which all teeth of both of the said gears and of both of the said pinions are of involute contour throughout the interengageable portions of their faces and flanks.

20. A reverse gear as described in claim 14, including the combination therein defined, in which all teeth of both of the said gears and of both of the said pinions are of involute contour throughout the interengageable portions of their faces and flanks, said contour in each of said pinions being developed from base circles of equal diameters and said contour in each of said gears being developed from base circles of equal diameters.

21. A reverse gear as described in claim 14, including the combination therein defined, in which the sum of the angle of approach and angle of recession in each of said gears and pinions subtends an arc on the pitch circle of each said gear or pinion of greater length than the circular pitch of the teeth of each said such gear or pinion.

22. A reverse gear as described in claim 14, including the combination therein defined, in which the difference in dimensions between the said overall diameters of said sun gears and planet pinions is such that the path of travel of teeth of the said long planet pinion clears the path of travel of teeth of the said sun gear which has the smaller overall diameter.

23. A reverse gear as described in claim 14, including the combination therein defined, in which all teeth of both of the said gears and of both of the said pinions are of involute contour throughout the interengageable portions of their faces and flanks, said contour in the larger of said sun gears being developed from a base circle of smaller diameter than its root circle, and said contour in the smaller of said sun gears being developed from a base circle of greater diameter than its root circle.

24. A reverse gear as described in claim 14, including the combination therein defined, in which all teeth of both of the said gears and of both of the said pinions are of involute contour throughout the interengageable portions of their faces and flanks, said contour in the larger of said sun gears being developed from a base circle of smaller diameter than its root circle, and said contour in the smaller of said sun gears and in both of the said planet pinions being developed from base circles of greater diameter than the root circles thereof.

DOUGLAS M. PIERPONT.